UNITED STATES PATENT OFFICE.

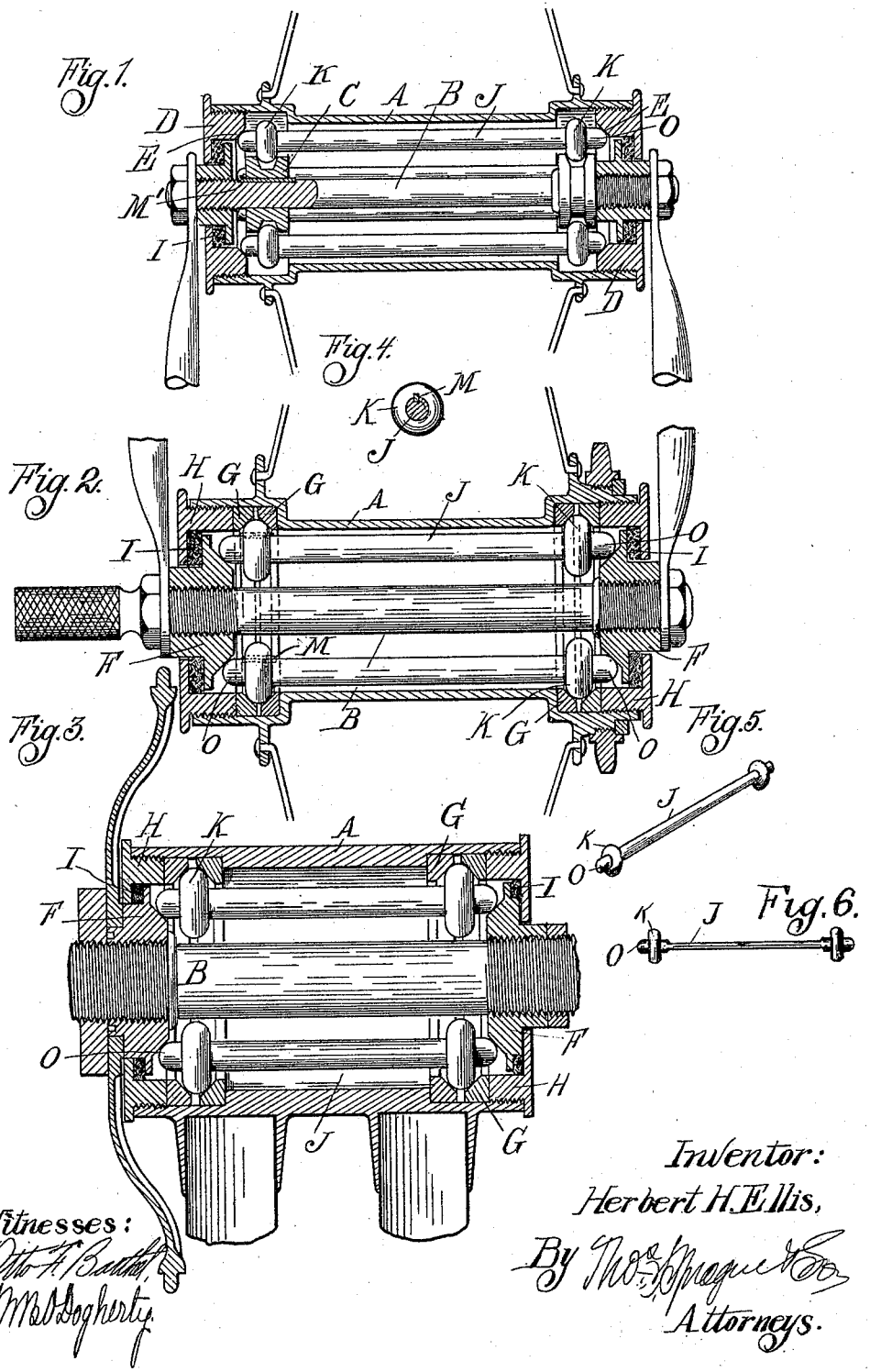

HERBERT H. ELLIS, OF WALKERVILLE, CANADA, ASSIGNOR OF ONE-HALF TO WILLIAM J. PAYNE, OF CANDOR, NEW YORK, AND CHARLES A. SULLIVAN, OF WINDSOR, CANADA.

ROLLER-BEARING.

SPECIFICATION forming part of Letters Patent No. 585,561, dated June 29, 1897.

Application filed August 1, 1896. Serial No. 601,356. (No model.)

*To all whom it may concern:*

Be it known that I, HERBERT H. ELLIS, a subject of the Queen of Great Britain, residing at Walkerville, in the county of Essex and Province of Ontario, Canada, have invented certain new and useful Improvements in Roller-Bearings, of which the following is a specification, reference being had therein to the accompanying drawings.

The invention consists in the construction of a roller-bearing especially designed for vehicle-wheels, but which may be used for shafting or for any other purpose.

The invention in detail consists in the construction of a device comprising a series of rollers with enlargements thereon combined with a hub or casing and an axle, the enlargements having a bearing on one of these two members and end extensions on the roller having a contact or bearing on the other member, and, further, in the construction, arrangement, and combination of the various parts, all as more fully hereinafter described.

In the drawings, Figure 1 is a central section through the front wheel of a bicycle, showing my improvement applied thereto. Fig. 2 is a similar section of the rear wheel, showing the opposite arrangement of the bearings. Fig. 3 is a section through the crank-hanger, showing the same arrangement of parts as in Fig. 2. Fig. 4 is a cross-section through one of the rollers, and Fig. 5 is a detached perspective view of one of the rollers. Fig. 6 is a detached elevation of a modified form of roller.

A is the hub or casing. B is the axle, and between these two members is arranged the roller having a bearing upon both to reduce the friction in the rotation of one in relation to the other.

The bearings on the shaft may be grooved blocks C, as shown in Fig. 1, in which case the end bearing is preferably a ring D, engaging a screw-thread on the inner face of the hub A and having an inclined face E for the rollers, as will be hereinafter described, or the bearing on the axle may be in the shape of cones F, as shown in Figs. 2 and 3, adjustable on the axle, and the bearing on the hub in this case is formed in the shape of a groove preferably by arranging the two bearing-rings G in the end of the hub, these rings being adjusted by means of the adjusting-ring H.

I preferably employ a suitable dust-proof packing I between the hub and the axle, which may be of any desired construction. The rollers comprise the shaft or roller proper, J, having near each end enlargements or sleeves K, either formed integral with the roller or secured thereon. In most cases I find it desirable to arrange one of these enlargements so as to have a slight end play on its roller to permit of the adjustment of the parts, so as to have a true bearing at all times. This I preferably effect by sleeving the enlargement K over the end of the roller and connecting the two parts together by a feather M, so as to permit of this end movement, at the same time to cause the roller and its enlargement to move together. Projecting beyond these enlargements are the round extensions O, which have a bearing upon the inclined face of the cones F or the inclined face E of the ring D, forming a support upon one of the members to which the roller-bearing is applied and also take care of the end thrust to which said parts may be subjected.

By properly proportioning the parts of a bearing thus constructed I find that I may obtain a bearing with very few rolls or rollers and with a rolling contact on both members of the bearing.

I may, if desired for the purpose of lightening up the bearing, reduce the connecting portions of the rollers, as shown in Fig. 6.

In Fig. 1 I have shown the bearing C capable of longitudinal adjustment on the shaft by providing the latter with a feather M'. In this case it will be obvious that the enlargements K may all be integral with the roller proper, J.

What I claim as my invention is—

1. In a roller-bearing, the combination of the inclosing casing or hub, and the axle, of rollers, sleeves or enlargements thereon, having bearing on one member, and a rounded extension on the end of the roller, having a bearing on the other member and constituting the only point of contact of the roller with said second member.

2. In a roller-bearing, the combination of the casing or hub, the axle, the rollers, rounded enlargements thereon having bearing on one member, a rounded extension on the end of the roller having a bearing and constituting the only point of contact of the roller with said second member on the other member, and means for adjusting the end bearing.

3. In a roller-bearing, the combination of the casing or hub, the axle, the rollers, rounded enlargements thereon, having bearing on one member, one of these enlargements of each roller having an endwise movement thereon, and a rounded end extension on the rollers having a bearing on the other member.

4. In a roller-bearing, the combination with the casing or hub, the axle, bearing-blocks on the axle one of which is adjustable, rollers, rounded enlargements on the rollers, rounded extensions on the rollers, the former bearing on the said blocks, and cones constituting bearings for the latter, substantially as described.

In testimony whereof I affix my signature in presence of two witnesses.

HERBERT H. ELLIS.

Witnesses:
 M. B. O'DOGHERTY,
 OTTO F. BARTHEL.